US006683704B1

(12) United States Patent
Spears et al.

(10) Patent No.: US 6,683,704 B1
(45) Date of Patent: Jan. 27, 2004

(54) APPARATUS FOR DETERMINING THE BEST IMAGE FROM A DUAL RESOLUTION PHOTO SENSOR

(75) Inventors: Kurt Spears, Fort Collins, CO (US); Edward S Beeman, Windsor, CO (US); James C Albritton-McDonald, Bellvue, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/569,961

(22) Filed: May 12, 2000

(51) Int. Cl.[7] ................................. H04N 1/04
(52) U.S. Cl. .............. 358/483; 358/483; 358/463; 358/474; 358/486; 382/312; 382/318; 382/274; 382/275; 250/208.1

(58) Field of Search ................. 358/486, 474, 358/483, 463, 443; 250/208.1; 382/312, 318, 274, 275

(56) References Cited

U.S. PATENT DOCUMENTS

| 4,266,249 A | * | 5/1981 | Chai et al. | ............. 358/426.16 |
| 4,782,399 A | * | 11/1988 | Sato | ........................... 358/443 |
| 5,917,952 A | * | 6/1999 | Noh | ........................... 358/3.07 |
| 6,009,214 A | | 12/1999 | Suggs | ........................ 382/312 |

* cited by examiner

Primary Examiner—Edward Coles
Assistant Examiner—Heather D Gibbs
(74) Attorney, Agent, or Firm—Steven L. Webb

(57) ABSTRACT

A method of combining the low resolution, higher signal-to-noise information with the high resolution, low signal-to-noise information created by a dual resolution CCD is disclosed.

5 Claims, 5 Drawing Sheets

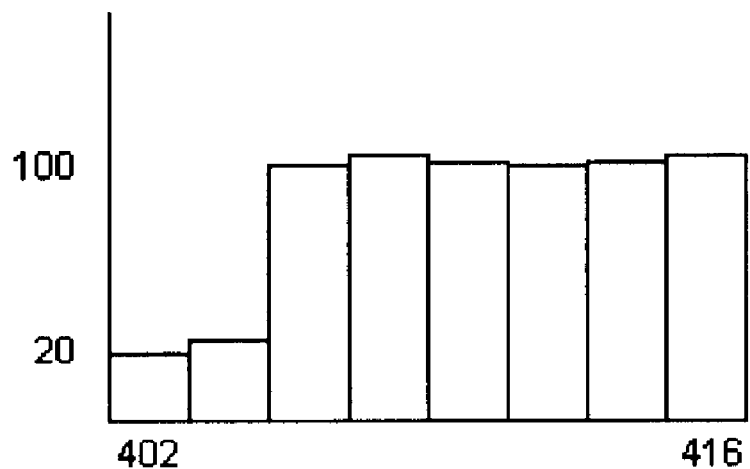
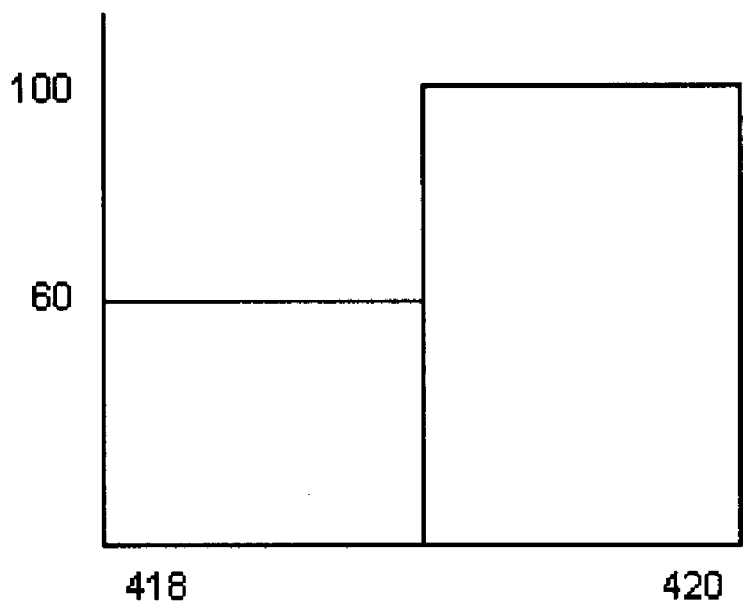
Figure 5

APPARATUS FOR DETERMINING THE BEST IMAGE FROM A DUAL RESOLUTION PHOTO SENSOR

FIELD OF THE INVENTION

The present invention relates generally to image capture devices that have a photo sensor or sensors that have dual resolutions. The photo sensor or sensor array has a set of high-resolution photo elements and a set of lower resolution photo elements. Substituting the low resolution signal for the high resolution signal in areas of the image that have low signal strength and low spatial frequency can improve the signal to noise ratio of the image.

BACKGROUND OF THE INVENTION

Digital scanners typically create an image by focusing an area of a page onto a photo sensor. The photo sensor is typically a charged-coupled device (CCD). The CCD is typically composed of a row of photosensitive elements. The row of elements is typically imaged across the width of the scanner bed. The width across the bed of a scanner is typically called the x-direction and the length along the long axis of a scanner bed is typically called the y-direction. To create an image of the page, the row of photo sensors is typically moved along the y-direction, taking exposures corresponding to each row along the x-direction. The optical resolution of the scanner in the x-direction is equal to the number of photosensitive elements in the CCD divided by the width of the page. The resolution of a scanner in the y-direction is a function of the movement rate of the CCD along the y-direction and the exposure rate of the CCD.

Today one of the main purchasing criteria is the optical resolution of a scanner. This tends to drive scanner manufactures to increase the optical resolution of scanners. For a given CCD die size, as the optical resolution in the x-direction increases, the size of the photo sensor elements decreases. The CCD die size is contained to keep the price of the CCD reasonable. Typically the CCD has three rows of photosensitive elements, one each for detecting red, green, and blue light. The spacing between the three rows of photosensitive elements is one factor in determining the amount of memory needed in the scanner. The larger the line spacing between rows, the more memory needed. Unfortunately the shift registers also need to be in-between the rows of photosensitive elements. The spacing between the rows, and the number of elements in each row, limit the size of each shift register. The smaller the size of the shift register, the lower the signal carrying capacity of those shift registers, which results in a lower possible the signal-to-noise ratio. FIG. 1 shows a plot of the signal-to-noise ratio vs. absolute signal level for a lower resolution CCD and a higher resolution CCD which have the same die size and line spacing. The increase in noise is a bigger problem in the dark areas of an image. This is true for two reasons. First when the image signal is low the noise sources are large by comparison, which negatively impacts the signal-to-noise ratio in the dark areas of the image. Second the human visual system is more sensitive to noise in dark areas of an image.

One of the solutions to this problem is a CCD that contains two different resolutions. The CCD has a row of high-resolution photo sensors and a row of lower resolution photo sensors. The high-resolution row of photo sensors is typically two times the resolution of the lower resolution photo sensors. Color scanners typically have three rows of photo sensors, one row for each color (red, green and blue). The dual resolution color CCD has three rows of photo sensors for each resolution for a total of six rows of photo sensor elements (see FIG. 2). The scanner uses the high resolution CCD for high-resolution scans and the low resolution CCD for low resolution scans. Unfortunately this only solves the noise problem for the lower resolution scans when the scanner is using the low-resolution, higher signal-to-noise photo sensors. Therefore there is a need for a system that can combine the improved signal-to-noise characteristics of the low-resolution sensor signal, with the high-resolution signal, without losing the high spatial frequency information from the high-resolution signal.

SUMMARY OF THE INVENTION

A method of combining the low resolution, higher signal-to-noise information with the high resolution, low signal-to-noise information created by a dual resolution CCD.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 5 is a chart of the signal strengths of the pixels from FIG. 4.

DETAILED DESCRIPTION OF THE PREFERRED EMBODIMENT

A system that can combine the low noise information with the high-resolution information without losing the higher spatial information from the high resolution CCD can improve an image created with a dual resolution CCD.

Figure 1:
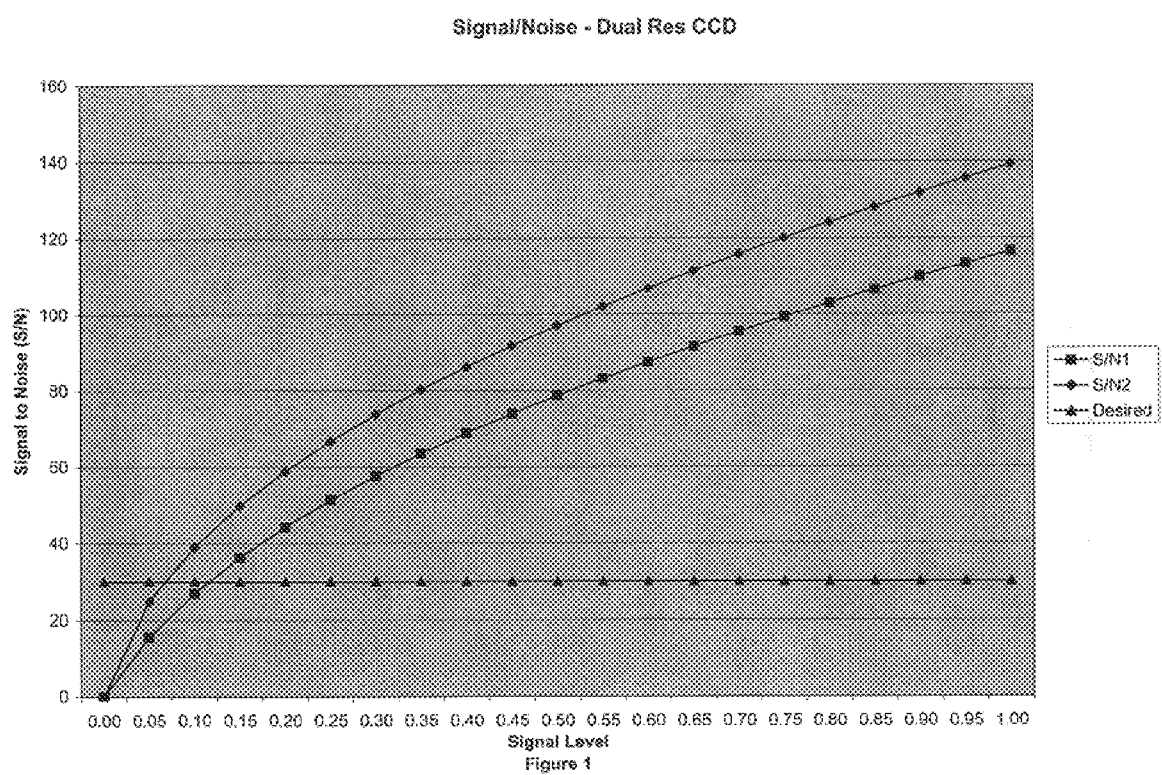
FIG. 1 is a chart of the signal-to-noise ratio vs. absolute signal of a 600 ppi CCD and a 1200 ppi CCD.
Figure 2:
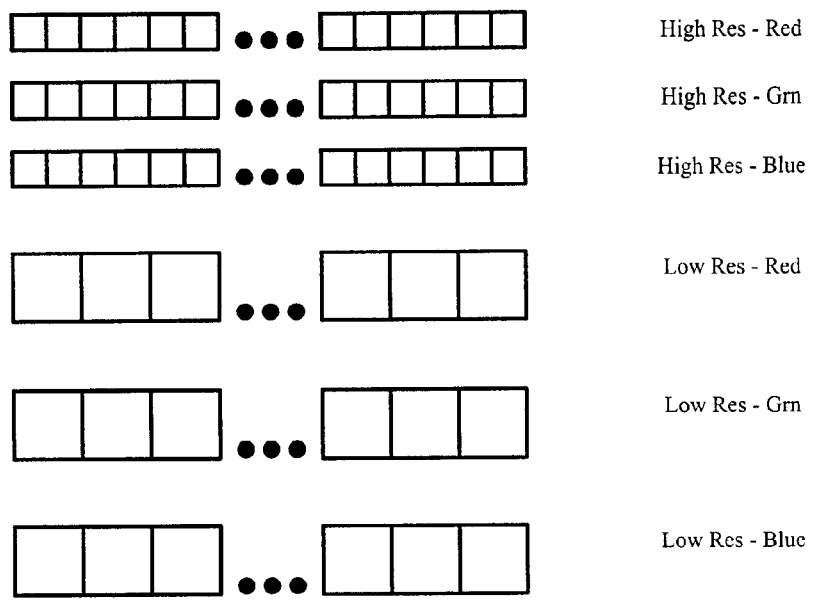
FIG. 2 is a drawing of a dual resolution CCD.
Figure 3:
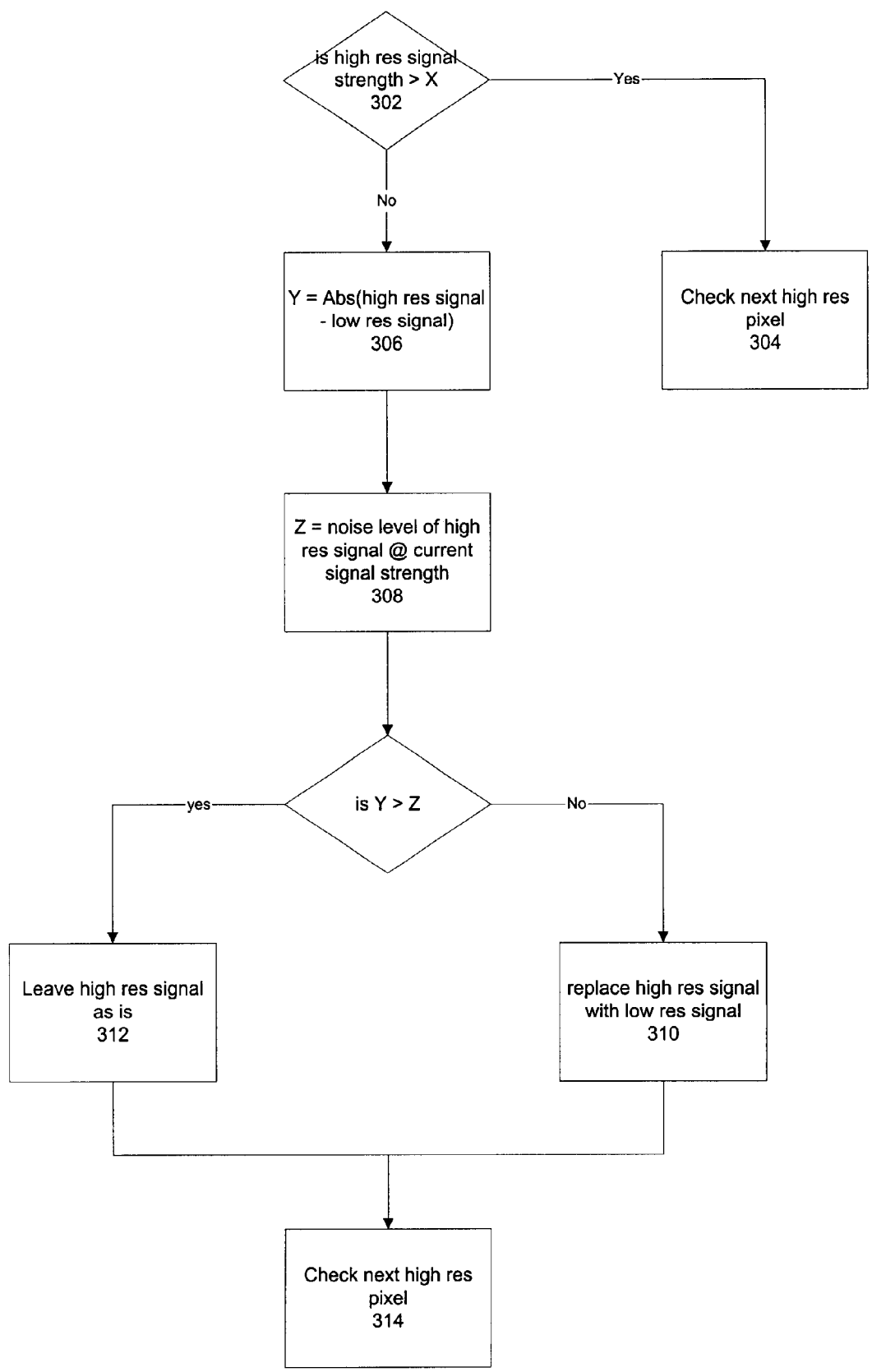
FIG. 3 is a flow chart of the method of combining the low resolution, higher signal-to-noise information with the high resolution, low signal-to-noise information created by a dual resolution CCD in accordance with the present invention.

CCD's have a number of different noise sources. Some of the noise sources are independent of the signal level collected by the photosensitive element. Other noise sources are dependent on the absolute signal level of the charge collected by the photosensitive element. Lower resolution CCDs have better signal-to-noise performance than higher resolution CCDs given the same die size, line spacing and the same amount of light falling on the photosensitive elements. Once the signal-to-noise ratio gets above a threshold, typically 30:1, the human eye can no longer see any difference. Therefore when the signal strength coming from the CCD corresponds to a signal-to-noise ratio less than 30:1 the signal coming from the lower resolution CCD is the best signal to select. Therefore the first step in the method of combining the information from the dual resolution CCD is comparing the absolute signal level of the high resolution CCD with a threshold value (see FIG. 3).

In one embodiment the threshold value is typically set at approximately 40% of the full charge level of the high resolution CCD. 40% is used as the threshold because both the high-resolution photo-sensors and the lower resolution photo sensors are still within their linear range. If the absolute signal level of a photo sensitive element in the high resolution CCD is greater than the threshold value then the signal is left undisturbed and the next photo sensitive element is checked (304). When the signal level of the high-resolution photosensitive element is below the threshold value the signal is examined to determine if the signal contains high frequency spatial information.

Figure 4:
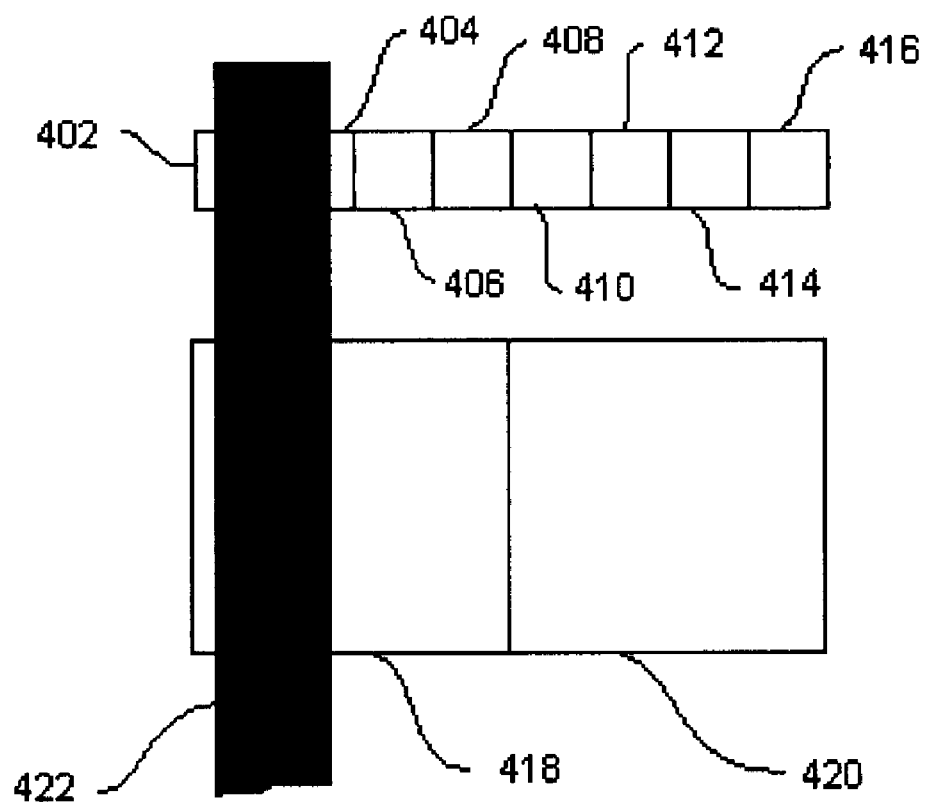
FIG. 4 is a drawing of a section of high resolution photo sensitive elements and their corresponding low resolution photo sensitive elements of a dual resolution CCD with a high spatial frequency line imaged on the CCD elements.

The method used to determine if a high resolution pixel contains high frequency spatial information is to compare the difference in the signal strength of the high resolution pixel and the corresponding low resolution pixel with the noise level in the high resolution pixel. This may be expressed by equation 1:

$$N(H_s) < ABS|H_s - L_s|,$$

where $N(H_s)$ is the noise at the current high-resolution signal strength, $H_s$ is the current high-resolution signal strength and $L_s$ is the current low-resolution signal strength. When the difference in the signal strength between the high and low resolution pixels is greater than the amount of noise possible in the high resolution pixel, then the difference must be due to a feature in the image and not due to noise. FIG. 4 shows a section of a high resolution CCD and the corresponding section of the low resolution CCD with a high frequency spatial line imaged onto the CCD segments. Photosensitive elements or pixels 402 and 404 from the high resolution CCD and pixel 418 from the low resolution CCD contain line 422. Pixels 406 through 416 of the high resolution CCD and pixel 420 of the low resolution CCD do not contain line 422. FIG. 5 shows the signal strength of the pixels from FIG. 4. The signal strength of pixels 402 and 404 are much lower than signal strength of pixels 406 through 416 due to line 422. The signal strength of pixels 406 and 408 are not equal to each other due to noise. Applying the method of equation 1 to pixel 402 would result in keeping the signal in pixel 402 undisturbed. The signal strength $H_s$ in pixel 402 is 20. The noise level $N(h_s)$ at signal strength 20 is 4. The signal strength $L_s$ of the corresponding low-resolution pixel 418 is 60. Which results in 4<ABS|20–60|. Applying the method of equation 1 to pixel 416 would result is a substitution of the signal from pixel 420 into pixel 416. The signal strength $H_s$ in pixel 416 is 99. The noise level $N(h_s)$ at signal strength 99 is 2. The signal strength $L_s$ of the corresponding low-resolution pixel 420 is 100. Which results in 2<ABS|99–100|. The noise levels and signal strengths used in the above examples are for illustration purposes to help explain the operation of the current invention. The actual noise levels used in this invention would be the noise levels that corresponded to the signal strength of the photosensitive elements.

The foregoing description of the present invention has been presented for purposes of illustration and description. It is not intended to be exhaustive or to limit the invention to the precise form disclosed, and other modifications and variations may be possible in light of the above teachings. For example, the first step of comparing the absolute signal strength of a pixel to a threshold value saves time by avoiding computation in cases when substitution is unlikely, but this step can be eliminated. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of combining low-resolution information with high-resolution information created by a dual resolution photo-sensor array, comprising:

determining a high-resolution signal for a high-resolution pixel;

determining a noise level for the high-resolution pixel;

determining a low-resolution signal for a corresponding low-resolution pixel;

replacing the high-resolution signal with the low-resolution signal as a function of the high-resolution signal, the low resolution signal, and the noise level of the high-resolution pixel.

2. The method of claim 1 further comprising:

computing a magnitude of a difference between the high-resolution signal and the signal of the corresponding low-resolution pixel.

3. The method of claim 2 further comprising:

replacing the high-resolution signal with the low-resolution signal when the noise level is less than the magnitude of the difference between the high-resolution signal and the corresponding low-resolution signal.

4. The method of claim 1 further comprising:

comparing the high-resolution signal with a threshold value; the high-resolution signal when the high solution signal is greater than the threshold value.

5. The method of claim 1 where the photo sensor array is a CCD.

* * * * *

UNITED STATES PATENT AND TRADEMARK OFFICE
CERTIFICATE OF CORRECTION

PATENT NO. : 6,683,704 B1  
APPLICATION NO. : 09/569961  
DATED : January 27, 2004  
INVENTOR(S) : Kurt Spears et al.

Page 1 of 1

It is certified that error appears in the above-identified patent and that said Letters Patent is hereby corrected as shown below:

Claim 4, Column 4, line 45, after "value;" insert --retaining--

Signed and Sealed this

Eighth Day of September, 2009

David J. Kappos  
*Director of the United States Patent and Trademark Office*